United States Patent [19]

Shimizu et al.

[11] Patent Number: 5,149,748
[45] Date of Patent: Sep. 22, 1992

[54] PROCESS OF PREPARING SURFACE-MODIFIED POLYMETHYLSILSESQUIOXANE SPHERICAL FINE PARTICLES

[75] Inventors: Takaaki Shimizu; Toshihiro Okon, both of Joetsu; Toshio Ohba; Yoshinori Inokuchi, both of Annaka, all of Japan

[73] Assignee: Shin-Etsu Chemical Co., Ltd., Tokyo, Japan

[21] Appl. No.: 450,822

[22] Filed: Dec. 14, 1989

[30] Foreign Application Priority Data

Dec. 15, 1988 [JP] Japan ................. 63-317539

[51] Int. Cl.⁵ ........................................ C08F 283/00
[52] U.S. Cl. .................... 525/477; 427/212; 428/407; 428/447
[58] Field of Search ............... 428/403, 405, 407, 447; 427/212; 525/477

[56] References Cited

U.S. PATENT DOCUMENTS

| | | | |
|---|---|---|---|
| 4,143,027 | 3/1979 | Sollman et al. | 428/405 |
| 4,424,297 | 1/1984 | Bey | 524/714 |
| 4,705,725 | 11/1987 | Glajch et al. | 428/405 |
| 4,778,624 | 10/1988 | Ohashi et al. | 252/312 |
| 4,818,614 | 4/1989 | Fukui et al. | 428/403 |
| 4,835,058 | 5/1989 | Komiya et al. | 428/403 |
| 4,871,616 | 10/1989 | Kimura et al. | 428/407 |
| 4,895,914 | 1/1990 | Saitoh et al. | 428/405 |
| 4,996,257 | 2/1991 | Saito et al. | 428/447 |
| 5,034,476 | 7/1991 | Saito et al. | 428/447 |

FOREIGN PATENT DOCUMENTS

| | | |
|---|---|---|
| 0110322 | 6/1984 | European Pat. Off. . |
| 0326810 | 8/1989 | European Pat. Off. . |
| 56-39808 | 9/1981 | Japan . |
| 60-13813 | 1/1985 | Japan . |
| WO88/07536 | 10/1988 | World Int. Prop. O. . |

Primary Examiner—Paul J. Thibodeau
Assistant Examiner—Robert Follett
Attorney, Agent, or Firm—Foley & Lardner

[57] ABSTRACT

The surface-modified polymethylsilsesquioxane spherical fine particles of this invention comprise polymethylsilsesquioxane spherical fine particles serving as nuclei, and at least one member of an alkyl group having two or more carbon atoms, an alkenyl group, a phenyl group, an epoxy group, an acryloxy group and an amino group is bonded to the surface of a particle. They are prepared by a process comprising the step of carrying out reaction in an aqueous suspension of polymethylsilsesquioxane fine particles in the presence of an alkali catalyst. The surface-modified spherical fine particles can have various organic groups on their surfaces, and are used in various fields such as rubbers, plastics, coating materials, inks, and cosmetics, depending on the types of the organic groups.

12 Claims, 2 Drawing Sheets

PROCESS OF PREPARING SURFACE-MODIFIED POLYMETHYLSILSESQUIOXANE SPHERICAL FINE PARTICLES

BACKGROUND OF THE INVENTION

1. Field of the Invention

This invention relates to surface-modified polymethylsilsesquioxane spherical fine particles and a process of preparing the same.

2. Description of the Prior Art

Polymethylsilsesquioxane spherical fine particles have been hitherto used to improve properties such as lubricity and water repellency, in the fields of rubbers, plastics, coating materials, inks, cosmetics, etc. For example, they are added in rubber as a reinforcing material of addition-type silicone rubbers.

The polymethylsilsesquioxane spherical fine particles hitherto used, however, have no functional group capable of forming a linkage with a siloxane skeleton of silicone rubbers and hence can form no strong linkage with rubber. For this reason, the strength of rubber can not be improved so much, bringing about the problem that the resulting rubbers have a low strength.

SUMMARY OF THE INVENTION

Accordingly, an object of this invention is to provide surface-modified polymethylsilsesquioxane spherical fine particles having various groups on their surfaces and useful in a variety of purposes, and also a process for preparing such fine particles.

The surface-modified polymethylsilsesquioxane spherical fine particles of this invention have on their surfaces at least one member selected from the group consisting of an alkyl group having two or more carbon atoms, an alkenyl group, a phenyl group, an epoxy group, an acryloxy group, and an amino group.

The present surface-modified spherical fine particles can be prepared by a process comprising the step of carrying out reaction in the presence of an alkali catalyst while dropwise adding in an aqueous suspension of polymethylsilsesquioxane fine particles an organotrialkoxysilane having the above specified group.

DETAILED DESCRIPTION OF THE INVENTION

Structure of Surface-Modified Spherical Fine Particle

Figure 1:
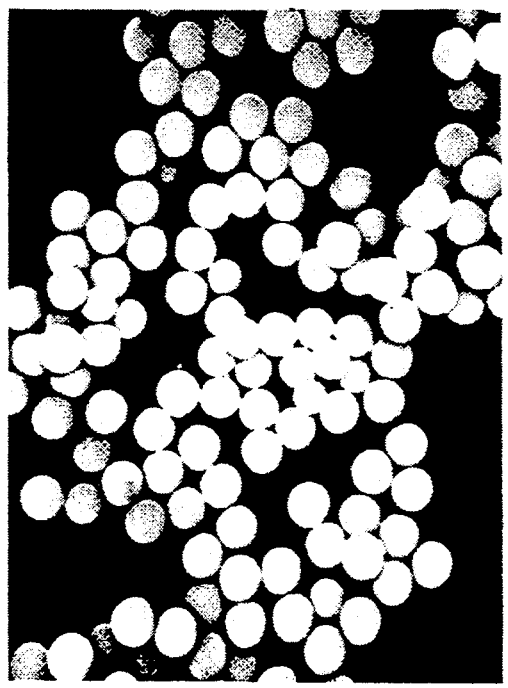
FIGS. 1 and 2 are scanning-type electron microscope photographs showing particle structures of polymethylsilsesquioxane spherical fine particles and surface-modified polymethylsilsesquioxane spherical fine particles, respectively, prepared in Example 1.

The surface-modified polymethylsilsesquioxane spherical fine particles of this invention comprise a polymethylsilsesquioxane spherical fine particle serving as a nucleus, and at least one member selected from the group consisting of an alkyl group having two or more carbon atoms, an alkenyl group, a phenyl group, an epoxy group, an acryloxy group, and an amino group (these specified groups are hereinafter called simply "organic group" unless any confusion is caused, although the unsubstituted amino group (—NH$_2$) is not an organic group), bonded to its surface. The organic group including these is present as an organic group possessed by a polyorganosilsesquioxane bonded to the surface of a polymethylsilsesquioxane spherical fine particle.

The polymethylsilsesquioxane spherical fine particles used as nuclei of the surface-modified spherical fine particles of this invention are spherical fine particles comprising a polymethylsilsesquioxane represented by the average unit formula (I):

$$CH_3SiO_{3/2} \qquad (I)$$

The average particle diameter of the spherical fine particles can be appropriately selected depending on the purpose for which the resulting surface-modified polymethylsilsesquioxane spherical fine particles are used. In usual instances, it may range from 0.2 to 5.0 micrometers.

The polymethylsilsesquioxane spherical fine particles can be prepared by a known process as exemplified by the process as disclosed in Japanese Patent Publication No. 39808/1981 or Japanese Pre-examination Patent Publication No. 13813/1985. More specifically, it can be prepared by hydrolyzing in an aqueous medium a methyltrialkoxysilane represented by the general formula (II):

$$CH_3Si(OR)_3 \qquad (II)$$

wherein R represents an alkyl group having 1 to 4 carbon atoms
and/or a partial hydrolysate thereof in the presence of an alkali catalyst, followed by condensation polymerization.

In the surface-modified polymethylsilsesquioxane spherical fine particles of this invention, the organic group bonded to the surface of the nucleus polymethylsilsesquioxane spherical fine particle includes at least one member selected from the group consisting of an alkyl group having two or more carbon atoms, an alkenyl group, a phenyl group, an epoxy group, an acryloxy group, and an amino group. The alkyl group having two or more carbon atoms includes, for example, an ethyl group, a propyl group, a butyl group, and a pentyl group. The alkenyl group includes a vinyl group, a propenyl group, and a butenyl group.

These organic groups may be those in which part or all of hydrogen atoms of the organic group may be substituted with a halogen atom(s), an amino group(s), a glycidoxy group(s), or an acryloxy group(s). The organic group having such a substituent(s) may include a 3,3,3-trifluoropropyl group, a 3-chloropropyl group, a gamma-aminopropyl group, an acryloxypropyl group, and a gamma-glycidoxypropyl group.

The organic group as described above is, as previously briefly described, present as the group possessed by a polyorganosilsesquioxane bonded to the surface of a polymethylsilsesquioxane spherical fine particle. In usual instances, it may preferably be present in a proportion of from 0.05 to 0.15 mol per mol of the polymethylsilsesquioxane unit represented by the average unit formula (I). An excessively large amount of this organic group may make it necessary to use the organoalkoxysilane, which is expensive, in a large quantity in order to prepare the surface-modified spherical fine particles, bringing about economical disadvantages. On the other hand, an excessively small amount of the organic group may sometimes result in no satisfactory exhibition of the function to be obtained by the introduction of the organic group.

Preparation of Surface-Modified Spherical Fine Particles

The surface-modified polymethylsilsesquioxane spherical fine particles of this invention can be prepared, for example, by a process comprising the step of carrying out reaction in the presence of an alkali catalyst while dropwise adding in an aqueous suspension of polymethylsilsesquioxane fine particles an organotrialkoxysilane represented by the general formula (III):

$$R^1Si(OR^2)_3 \qquad (III)$$

wherein $R^1$ represents the group corresponding to the organic group possessed on the polymethylsilsesquioxane particles, i.e. an organic group including at least one member selected from the group consisting of an alkyl group having two or more carbon atoms, an alkenyl group, a phenyl group, an epoxy group, an acryloxy group, and an amino group; and $R^2$ represents an alkyl group having 1 to 4 carbon atoms.

More specifically, this reaction can be represented by the following formula:

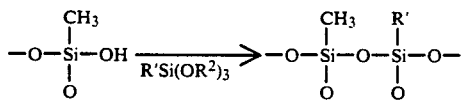

and it is presumed that the OH group on the end of the polymetylsilsesquioxane skelton is polycondensed with the organotrialkoxysilane to produce the surface-modified polymethylsilsesquioxane spherical fine particle to which the above organic group $R^1$ has been bonded.

Thus, it would be understood that in the organotrialkoxysilane of the general formula (III), used in the above process, the organic group $R^1$ corresponds to the organic group previously described and is introduced onto the surface of the polymethylsilsesquioxane fine particle nucleus in the form of an organic group contained in the polyorganosilsesquioxane. In the above general formula (III), $R^2$ represents an alkyl group having 1 to 4 carbon atoms, including, for example, a methyl group, an ethyl group, an isopropyl group, and a butyl group. Examples of this organotrialkoxysilane may include ethyltrimethoxysilane, propyltrimethoxysilane, butyltrimethoxysilane, vinyltrimethoxysilane, 3,3,3-trifluoropropyltriethoxysilane, 3-chloropropyltriisopropoxysilane, gamma-aminopropyltriethoxysilane, phenyltributoxysilane, acryloxypropyltrimethoxysilane, and gamma-glycidoxypropyltrimethoxysilane.

These organotrialkoxysilanes can be used alone or as a mixture of two or more kinds.

There are no particular limitations on the amount of the organotrialkoxysilane used. In usual instances, it may preferably be dropwise added in the suspension in an amount of from 0.01 to 0.3 mol, and more preferably from 0.04 to 0.15 mol, per mol of the polymethylsilsesquioxane average unit represented by the formula (I), of the nucleus polymethylsilsesquioxane fine particle. An excessively small amount of the organotrialkoxysilane makes it difficult to sufficiently modify the surfaces of the polymethylsilsesquioxane spherical fine particles.

The aqueous suspension of the polymethylsilsesquioxane spherical fine particles, used in the above preparation, may be formed by suspending the polymethylsilsesquioxane spherical fine particles in an aqueous alkali solution. Alternatively, the aqueous suspension obtained when the polymethylsilsesquioxane spherical fine particles are prepared as previously described may be used as it is. The concentration of the polymethylsilsesquioxane spherical fine particles in the aqueous suspension may, in usual instances, preferably be a concentration that gives from 1 to 3 mol/lit., and more preferably from 1 to 1.5 mol/lit., of the polymethylsilsesquioxane average unit. Use of an aqueous suspension having an excessively high concentration tends to cause melt-adhesion between particles in the steps of carrying out the reaction while dropwise adding the organotrialkoxysilane, making it difficult to obtain monodisperse fine particles. On the other hand, use of an aqueous suspension having an excessively low concentration makes it necessary to use a large-scale apparatus in the manufacture, bringing about economical disadvantages.

The organotrialkoxysilane may preferably be slowly added in the aqueous suspension in a time sufficiently taken in order to prevent the self-condensation of the organotrialkoxysilane. In usual instances, the rate of dropwise addition may preferably be so controlled that the ratio (v/V) of the rate of dropwise addition v [ml/min] of the organotrialkoxysilane to the sum total V of the quantities of the aqueous suspension of the polymethylsilsesquioxane spherical fine particles and the organotrialkoxysilane to be dropwise added may be always not more than 1.0. An excessively large ratio, in other words, an excessively high rate of the dropwise addition may cause self-condensation of the organotrialkoxysilane, which turns into a binder that causes melt-adhesion between polymethylsilsesquioxane spherical fine particles, making it difficult to obtain fine-particle powder with a good fluidity.

The alkali catalyst used in the above preparation includes, for example, alkali metal hydroxides such as sodium hydroxide and potassium hydroxide, alkaline earth hydroxides such as calcium hydroxide and magnesium hydroxide, ammonia, and amines such as dimethylamine and trimethylamine. In usual instances, this alkali catalyst is previously mixed in the aqueous suspension of the polymethylsilsesquioxane. It may be used in a concentration ranging from 0.01 to 0.05 mol/lit., and preferably from 0.02 to 0.03 mol/lit. in the aqueous suspension. An excessively low concentration of the alkali catalyst tends to cause melt-adhesion between fine particles, making it liable to cause gelation of the aqueous suspension. An excessively high concentration may result in so high a rate of the hydrolysis of the organotrialkoxysilane that an amorphous gel is liable to be formed.

The reaction may, in usual instances, be carried out at a temperature of from about 0° to 80° C., and preferably from 10° to 30° C. An excessively low reaction temperature makes it liable for the suspension to freeze. An excessively high reaction temperature may result in so high a rate of the hydrolysis of the organotrialkoxysilane that an amorphous gel is liable to be formed.

There are no particular limitations on the stirring of the reaction mixture. In usual instances, the reaction mixture may preferably be slowly stirred at 1000 r.p.m. or less. When, however, it is stirred under a high shearing force as in a homogenizer, the polyorganosilsesquioxane having the above organic group tends not to be bonded to the surfaces of the polymethylsilsesquioxane spherical fine particles, resulting in the formation of an amorphous gel. After completion of the dropwise addition of the organotrialkoxysilane, post-stirring should be carried out for not less than about 1 hour in order to complete the reaction.

After completion of the reaction, neutralization of the alkali catalyst, washing, dewatering, and drying may be carried out according to conventional methods, so that a powder comprising the surface-modified polymethylsilsesquioxane spherical fine particles can be obtained.

The preparation process as described above makes it possible to obtain the surface-modified spherical fine particles of this invention in a relatively short time with ease, without causing the discharge of an organic solvent in a large quantity.

Uses of Surface-Modified Spherical Fine Particles

The surface-modified polymethylsilsesquioxane spherical fine particles of this invention, having various organic groups on their surfaces, are useful in a variety of purpose. For example, the surface-modified polymethylsilsesquioxane spherical fine particles of this invention that have a vinyl group as the organic group, when added in an addition-type silicone rubber as a reinforcing material, can achieve a linkage of the vinyl group with a siloxane skeleton in the rubber. Thus, a rubber with a high strength can be obtained. For another example, the surface-modified spherical fine particles that have a 3,3,3-trifluoropropyl group as the organic group bonded to the surface can promise an improvement in release properties as a molding rubber filler.

EXAMPLES

This invention will be described below in greater detail by giving Examples and Comparative Example. In the following description, "part(s)" refers to "part(s) by weight".

EXAMPLE 1

1) Preparation of Polymethylsilsesquioxane Spherical Fine Particles

In a 1 lit. internal volume four-necked flask equipped with a propeller stirring blade of 68 mm in outer diameter, a dropping funnel and a thermometer, 748 parts of water and 2 parts of Ca(OH)$_2$ were charged. Thereafter, with temperature maintained at 20° C. and with stirring at 450 r.p.m. as the number of revolutions of the stirring blade, 180 parts of methyltrimethoxysilane was dropwise added from the dropping funnel over a period of 3 hours. Reaction was thus carried out to form an aqueous suspension of polymethylsilsesquioxane spherical fine particles.

Polymethylsilsesquioxane spherical fine particles were collected from this aqueous suspension by filtration, and a scanning-type electron microscope photograph thereof (5,000 magnifications) was taken, which was as shown in FIG. 1.

2) Surface Modification

In 0.98 lit. of the aqueous suspension, obtained in the above, of polymethylsilsesquioxane spherical fine particles (polymethylsilsesquioxane content: 1.32 mol in terms of the methylsilsesquioxane average unit; Ca(OH)$_2$ concentration: 0.027 mol/lit.), 20 parts (0.135 mol) of vinyltrimethoxysilane was dropwise added from the dropping funnel over a period of 30 minutes, with temperature maintained at 20° C. and with stirring at 450 r.p.m. as the number of revolutions of the stirring blade. After the dropwise adding was completed, the stirring was continued for 1 hour, followed by addition of 2 parts of acetic acid so that the suspension was neutralized. The suspension was then filtered, and washed twice with water, followed by drying. As a result, a powder comprised of surface-modified polymethylsilsesquioxane spherical fine particles with excellent free fluidity was obtained.

Figure 2:
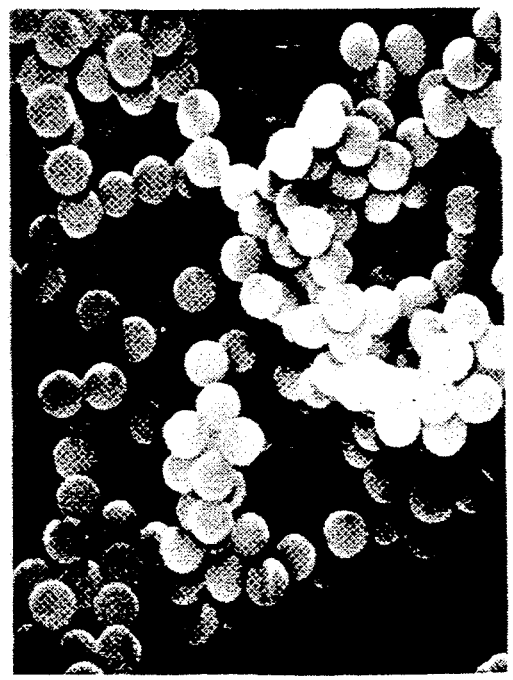

A scanning-type electron microscope photograph (5,000 magnifications) of the resulting fine particles was taken, which was as shown in FIG. 2.

Figure 3:
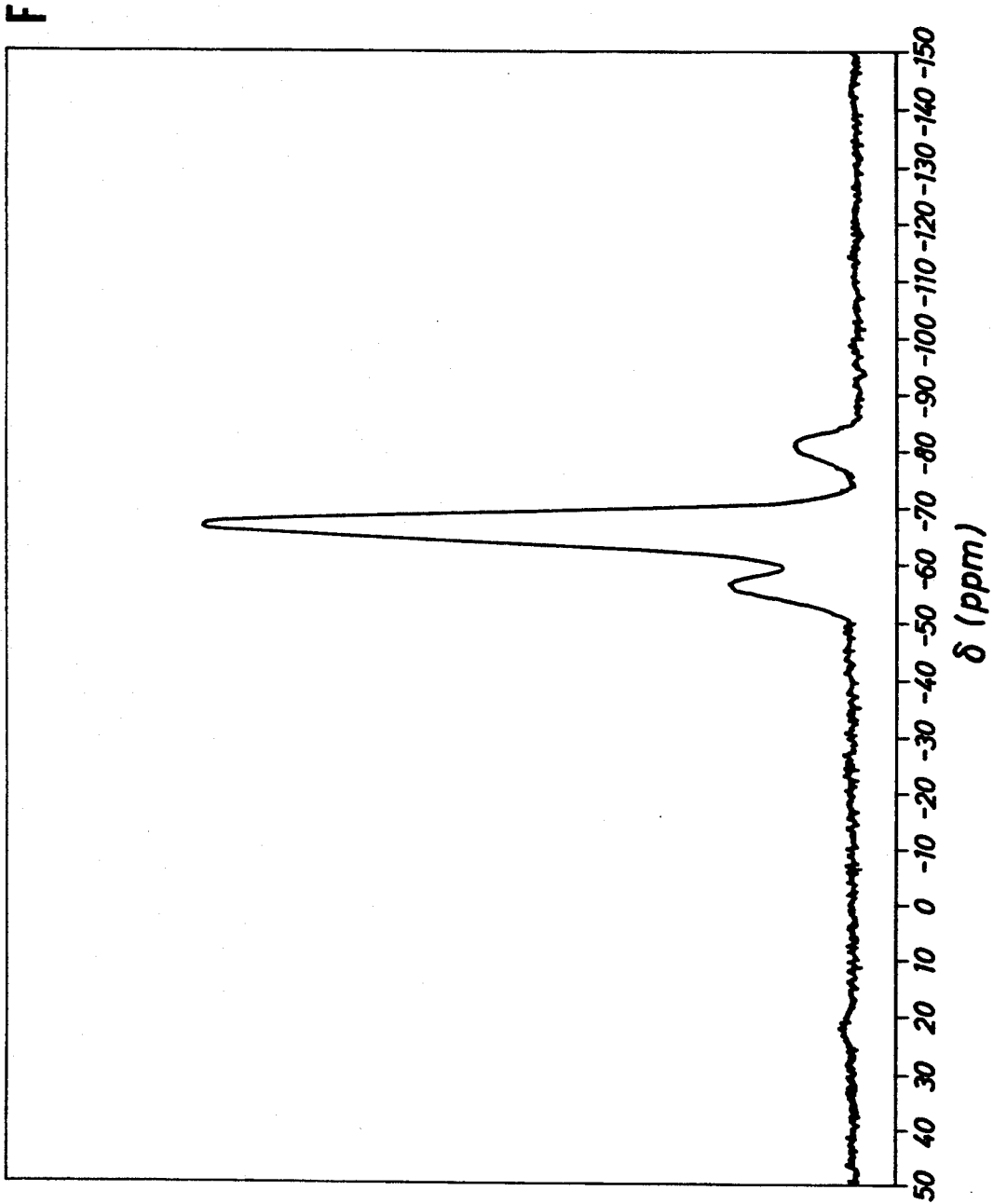
FIG. 3 shows a $^{29}$Si—NMR spectrum obtained by the CPMAS method, measured on surface-modified polymethylsilsesquioxane spherical fine particles prepared in Example 1.

Comparison of FIG. 1 and FIG. 2 showed that the vinyltrimethoxysilane was bonded to the surfaces of polymethylsilsesquioxane spherical fine particles without causing self-condensation. Measurement of $^{29}$Si—NMR spectrum by the CPMAS method also gave the chart as shown in FIG. 3. The three absorption peaks in the spectrum thus measured are attributable to the following:

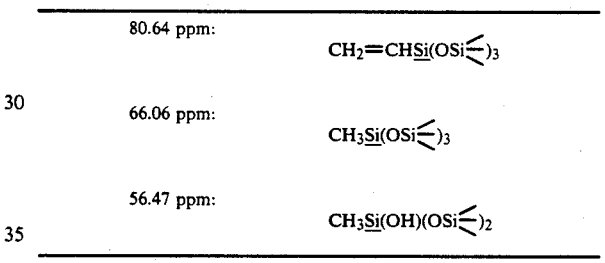

| 80.64 ppm: | CH$_2$=CH$\underline{\text{Si}}$(OSi$\lesssim$)$_3$ |
| 66.06 ppm: | CH$_3$$\underline{\text{Si}}$(OSi$\lesssim$)$_3$ |
| 56.47 ppm: | CH$_3$$\underline{\text{Si}}$(OH)(OSi$\lesssim$)$_2$ |

In the $^{29}$Si—NMR by the CPMAS method, only the spectrum originating from Si incorporated in the siloxane skeleton on the silica surface is measured, so that the vinylsilyl groups are seen to have formed siloxane bonds to the silanol groups on the surfaces of the fine particles.

As an index for a vinyl-group content of the powder comprised of the fine particles thus obtained, the iodine value was measured according to the Wijis method shown below. The result is shown in Table 1.

Measurement of Vinyl Groups by Wijs Method

In 15 ml of acetic acid, 0.5 g of sample powder is suspended, and 25 ml of a Wijs solution (a 0.2N iodine monochloride/acetic acid solution) is added thereto. The suspension is left for 2 hours in the dark kept at a constant temperature of 25° C., so that the reaction of the iodine with the vinyl groups is carried out. Next, 15 ml of an aqueous 20 wt. % potassium iodine solution and 100 ml of water are added, and the iodine liberated is titrated in a 0.1N sodium thiosulfate until the starch end-point is indicated. The quantity of consumed iodine is thus measured.

The powder of the fine particles obtained in the above was also refluxed in xylene at 130° C. for 2 hours, followed by drying. Thereafter, iodine values were measured as the indeces of a vinyl-group content, in the same manner as the above. As a result, there was found no difference in the iodine values before and after the reflux. This showed that vinylsilsesquioxane was firmly bonded to the surfaces of the fine particles obtained.

EXAMPLES 2 AND 3

Example 1 was repeated to give powders comprised of surface-modified polymethylsilsesquioxane spherical fine particles, except that the mixtures of compounds with the composition as shown in Table 1 (total molar number: 0.138 and 0.144, respectively) were each used in the modification of the surfaces of fine particles in place of the vinyltrimethoxysilane used in the step 2) in Example 1.

The iodine value was measured as the index of the vinyl-group content of each resulting powder. Results obtained are shown in Table 1.

TABLE 1

| Example: | Compound used in surface modification | Iodine value ($I_2$ g/100 g) |
| --- | --- | --- |
| 1 | Vinyltrimethoxysilane, 20 parts | 14.02 |
| 2 | Vinyltrimethoxysilane, 15 parts Methyltrimethoxysilane, 5 parts | 11.97 |
| 3 | Vinyltrimethoxysilane, 5 parts Methyltrimethoxysilane, 15 parts | 5.94 |

EXAMPLE 4

1) Preparation of Polymethylsilsesquioxane Spherical Fine Particles

In a 500 ml internal volume four-necked flask equipped with a propeller stirring blade of 68 mm in outer diameter, a dropping funnel and a thermometer, 399 parts of water and 1 part of $Ca(OH)_2$ were charged. Thereafter, with temperature maintained at 20° C. and with stirring at 250 r.p.m. as the number of revolutions of the stirring blade, 90 parts of methyltrimethoxysilane was dropwise added from the dropping funnel over a period of 3 hours and 20 minutes. Reaction was thus carried out.

Figure 4:
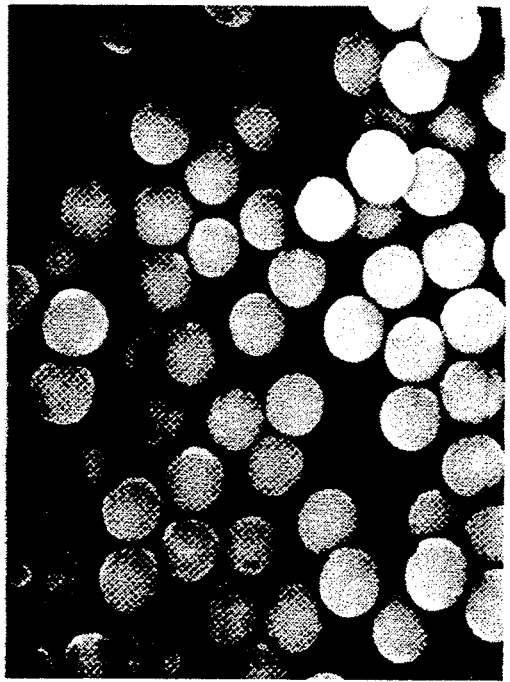
FIGS. 4 and 5 are scanning-type electron microscope photographs showing particle structures of polymethylsilsesquioxane spherical fine particles and surface-modified polymethylsilsesquioxane spherical fine particles, respectively, prepared in Example 4.

The resulting reaction mixture was an aqueous suspension of polymethylsilsesquioxane spherical fine particles. Polymethylsilsesquioxane spherical fine particles were collected from this aqueous suspension by filtration, and a scanning-type electron microscope photograph thereof (5,000 magnifications) was taken, which was as shown in FIG. 4.

2) Surface Modification

In 0.49 lit. of the aqueous suspension, obtained in the above, of polymethylsilsesquioxane spherical fine particles (polymethylsilsesquioxane content: 0.66 mol in terms of the methylsilsesquioxane average unit), 10 parts (0.0532 mol) of 3,3,3-trifluoropropyltrimethoxysilane was dropwise added from the dropping funnel over a period of 45 minutes, with temperature maintained at 20° C. and with stirring at 250 r.p.m. as the number of revolutions of the stirring blade. After the dropwise adding was completed, the stirring was continued for 1 hour, followed by addition of 1 part of acetic acid so that the suspension was neutralized. The suspension was then filtered, and washed twice with water, followed by drying. As a result, a white powder comprised of surface-modified polymethylsilsesquioxane spherical fine particles with excellent fluidity was obtained.

Figure 5:
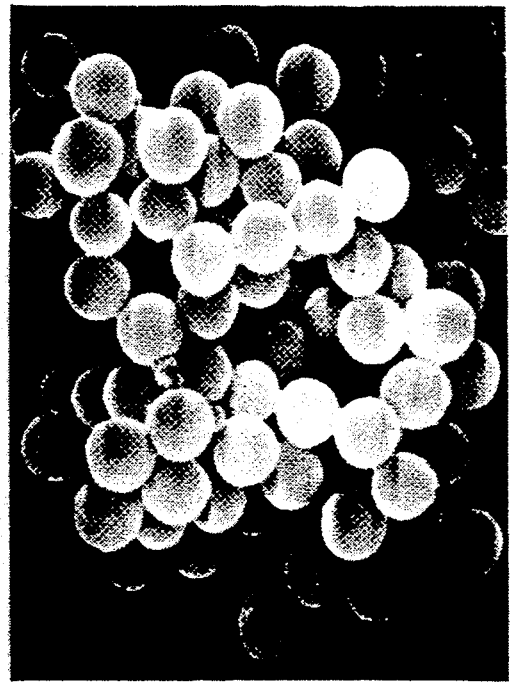

A scanning-type electron microscope photograph (5,000 magnifications) of the resulting fine particles was taken, which was as shown in FIG. 5. Comparison of FIG. 4 and FIG. 5 showed that the 3,3,3-trifluoropropyltrimethoxysilane was bonded to the surfaces of polymethylsilsesquioxane spherical fine particles without causing self-condensation. The water repellency of the powder of the fine particles obtained was also measured according to the following method. The result is shown in Table 2. As a comparative example, the water repellency was also measured on polymethylsilsesquioxane spherical fine particles having subjected to no surface modification, the result of which is shown together in Table 2.

Measurement of Water Repellency

Seven kinds of water-methanol mixed solutions were prepared with stepwise changes in methanol concentration, ranging from 0 to 30% by volume at intervals of 5% by volume. In a 10 ml internal volume test tube with a stopper, containing 5 ml of the mixed solution in each concentration, 0.1 g of sample fine-particle powder is put, and the test tube is shaken for 2 minutes with a shake width of 42 mm and at a shake number of 200 times/min., using a shaker (SA-31 Type; manufactured by Yamato Kagaku K.K.). A limit methanol concentration at which the powder is not wetted at all with a mixed-solution layer after the shaking is completed and the test tube is allowed to stand is assumed as value M, which is used as the index of the water repellency. When the powder is wetted, the mixed solution becomes slightly opaque. Hence, the evaluation on whether or not the powder is wetted can be made with ease. For example, when the powder is not wetted in a solution of a methanol concentration of 0% by volume (i.e., water) but is wetted in a mixed solution of a methanol concentration of 5% by volume, the value M is regarded as 0. When it is wetted in water, the value M is regarded as "none".

EXAMPLES 5 and 6

Example 4 was repeated to give powders comprised of surface-modified polymethylsilsesquioxane spherical fine particles, except that the mixtures of compounds with the composition as shown in Table 2 (total molar number: 0.0583 and 0.0684, respectively) were each used in the modification of the surfaces of fine particles in place of the 3,3,3-trifluoropropyltrimethoxysilane used in the step 2) in Example 4.

The value M was measured as the index of the water repellency of each powder obtained. Results are shown in Table 2.

TABLE 2

| Example: | Compound used in surface modification | Value M |
| --- | --- | --- |
| 4 | 3,3,3-Trifluoropropyltrimethoxysilane, 10 parts | 25 |
| 5 | 3,3,3-Trifluoropropyltrimethoxysilane, 7.5 parts Methyltrimethoxysilane, 2.5 parts | 15 |
| 6 | 3,3,3-Trifluoropropyltrimethoxysilane, 2.5 parts Methyltrimethoxysilane, 7.5 parts | 0 |
| Comparative Example: | — | None |

EXAMPLE 7

Example 1 was repeated to give a powder comprised of surface-modified polymethylsilsesquioxane spherical fine particles, except that gamma-aminopropyltriethoxysilane was used in place of vinyltrimethoxysilane.

Nitrogen content of the resulting powder was measured using a CHN elementary analyzer (026 Type; manufactured by Hitachi, Ltd.) to reveal that it was 1.85% by weight and the amino group was calculated to be in a proportion of 0.141 mol per mol of the polymethylsilsesquioxane unit represented by the average unit formula (I).

EXAMPLE 8

Example 1 was repeated to give a powder comprised of surface-modified polymethylsilsesquioxane spherical fine particles, except that 3-glycidoxypropyltriethoxysilane was used in place of vinyltrimethoxysilane.

Epoxy group-type oxygen content of the resulting powder was measured by the following halohydrin formation method to reveal that it was 1.0% by weight and the epoxy group was calculated to be in a proportion of 0.047 mol per mol of the polymethylsilsesquioxane unit represented by the average unit formula (I).

Halohydrin Formation Method

A fine-particle powder sample is added and suspended in 25 ml of a 0.2M $HCl-Et_2O$ mixed solution, and the suspension is left at room temperature for 3 hours to make the ring opening reaction of epoxy groups proceed. Thereafter, 50 ml of 95% EtOH is added, and the quantity of excessive HCl is measured using an aqueous 0.1N sodium hydroxide solution. The epoxy group-type oxygen content can be calculated since there is consumed 1 mol of HCl per mol of epoxy group-type oxygen.

What is claimed is:

1. A process for preparing surface-modified polymethylsilsesquioxane spherical fine particles, comprising the steps of:

hydrolyzing methyltrialkoxysilane represented by the general formula:

$$CH_3Si(OR)_3$$

wherein R represents an alkyl group having 1 to 4 carbon atoms or further hydrolyzing a partially-hydrolyzed product of the methyltrialkoxysilane in the presence of an alkali catalyst in aqueous solvent, subsequently carrying out condensation polymerization to obtain an aqueous suspension of a polymethylsilsesquioxane, and surface-modifying said polymethylsilsesquioxane fine particles at a temperature between about 0° and 80° C. by dropwise adding to said aqueous suspension of said particles an organotrialkoxysilane represented by the general formula:

$$R^1Si(OR^2)_3$$

wherein $R^1$ represents at least one member selected from the group consisting of an alkyl group having two or more carbon atoms, an alkenyl group, a phenyl group, an epoxy group, an acryloxy group and an amino group; and $R^2$ represents an alkyl group having 1 to 4 carbon atoms.

2. A process for preparing surface-modified polymethylsilsesquioxane spherical fine particles according to claim 1, wherein $R^1$ is selected from the group consisting of an ethyl group, a propyl group, a butyl group and a pentyl group.

3. A process for preparing surface-modified polymethylsilsesquioxane spherical fine particles according to claim 1, wherein $R^1$ is selected from the group consisting of a vinyl group, a propenyl group and a butenyl group.

4. A process for preparing surface-modified polymethylsilsesquioxane spherical fine particles according to claim 1, wherein $R^1$ is substituted with a member selected from the group consisting of a halogen atom, an amino group, an alkoxy group, a glycidoxy group and an acryloxy group.

5. A process for preparing surface-modified polymethylsilsesquioxane spherical fine particles according to claim 1, wherein $R^1$ is selected from the group consisting of a 3,3,3-trifluoropropyl group, a 3-chloropropyl group, a gamma-aminopropyl group, an acryloxypropyl group and a gamma-glycidoxypropyl group.

6. A process for preparing surface-modified polymethylsilsesquioxane spherical fine particles according to claim 1, consisting essentially of the hydrolysis, condensation polymerization and surface-modification steps.

7. A process for preparing surface-modified polymethylsilsesquioxane spherical fine particles according to claim 1, wherein an alkali catalyst is present during said surface-modifying step.

8. A process for preparing surface-modified polymethylsilsesquioxane spherical fine particles according to claim 7, consisting essentially of the hydrolysis, condensation polymerization and surface-modification steps.

9. A process for preparing surface-modified polymethylsilsesquioxane spherical fine particles according to claim 7, wherein $R^1$ is selected from the group consisting of an ethyl group, a propyl group, a butyl group and a pentyl group.

10. A process for preparing surface-modified polymethylsilsesquioxane spherical fine particle according to claim 7, wherein $R^1$ is selected from the group consisting of a vinyl group, a propenyl group and a butenyl group.

11. A process for preparing surface-modified polymethylsilsesquioxane spherical fine particles according to claim 7, wherein $R^1$ is substituted with a member selected from the group consisting of a halogen atom, an amino group, an alkoxy group, a glycidoxy group and an acryloxy group.

12. A process for preparing surface-modified polymethylsilsesquioxane spherical fine particles according to claim 7, wherein $R^1$ is selected from the group consisting of a 3,3,3-trifluoropropyl group, a 3-chloropropyl group, a gamma-aminopropyl group, an acryloxypropyl group and a gamma-glycidoxypropyl group.

* * * * *